US010518246B2

(12) United States Patent
Bang et al.

(10) Patent No.: US 10,518,246 B2
(45) Date of Patent: Dec. 31, 2019

(54) YOLK-SHELL PARTICLES, CATALYST, AND PREPARATION METHOD THEREFOR

(71) Applicant: LG CHEM, LTD., Seoul (KR)

(72) Inventors: Jungup Bang, Daejeon (KR); Jihyang Son, Daejeon (KR); Gyo Hyun Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/914,465

(22) PCT Filed: Nov. 28, 2014

(86) PCT No.: PCT/KR2014/011563
§ 371 (c)(1),
(2) Date: May 3, 2016

(87) PCT Pub. No.: WO2015/080519
PCT Pub. Date: Jun. 4, 2015

(65) Prior Publication Data
US 2016/0263557 A1 Sep. 15, 2016

(30) Foreign Application Priority Data

Nov. 29, 2013 (KR) .................. 10-2013-0147016

(51) Int. Cl.
*B01J 23/10* (2006.01)
*B01J 35/00* (2006.01)
(Continued)

(52) U.S. Cl.
CPC ................ *B01J 23/10* (2013.01); *B01J 2/00* (2013.01); *B01J 13/02* (2013.01); *B01J 21/12* (2013.01); *B01J 35/0006* (2013.01); *B01J 35/0086* (2013.01); *B01J 35/026* (2013.01); *B01J 37/0221* (2013.01); *B01J 37/10* (2013.01);
(Continued)

(58) Field of Classification Search
CPC ...... B01J 23/10; B01J 35/0006; B01J 35/026; B01J 21/12; B01J 37/0221; B01J 2/00; B01J 13/02; B01J 35/0086; B01J 37/10; C01F 17/0043
See application file for complete search history.

(56) References Cited

U.S. PATENT DOCUMENTS 5,073,657 A     12/1991   Warren
5,506,273 A *   4/1996   Haruta ................ B01J 23/52
                                         502/244
(Continued)

FOREIGN PATENT DOCUMENTS

CN        1525950 A    9/2004
CN       102344339     2/2012
(Continued)

OTHER PUBLICATIONS

Fang et. al., "CeO2—Al2O3, CeO2—SiO2, CeO2—TiO2 core-shell spheres: formation mechanisms and UV absorption", 2012, RSC Advances, 2, 5370-5375.*
(Continued)

*Primary Examiner* — James A Fiorito
(74) *Attorney, Agent, or Firm* — Dentons US LLP

(57) ABSTRACT

The present specification relates to a yolk-shell particle, a catalyst, and a method of manufacturing the same.

12 Claims, 4 Drawing Sheets

(51) Int. Cl.
*B01J 37/02* (2006.01)
*B01J 2/00* (2006.01)
*B01J 13/02* (2006.01)
*B01J 37/10* (2006.01)
*C01F 17/00* (2006.01)
*B01J 21/12* (2006.01)
*B01J 35/02* (2006.01)

(52) U.S. Cl.
CPC ......... *C01F 17/0043* (2013.01); *B01J 35/023* (2013.01); *B01J 37/0219* (2013.01); *B01J 37/0228* (2013.01); *C01P 2004/03* (2013.01); *C01P 2004/04* (2013.01); *C01P 2004/32* (2013.01); *C01P 2004/62* (2013.01); *C01P 2004/84* (2013.01)

(56) References Cited

U.S. PATENT DOCUMENTS

| | | | |
|---|---|---|---|
| 6,452,058 | B1 | 9/2002 | Schweizer et al. |
| 8,415,267 | B2 | 4/2013 | Lee |
| 2005/0106096 | A1 | 5/2005 | Hong et al. |
| 2007/0075052 | A1* | 4/2007 | Fanson ............... B01J 23/002 219/121.52 |
| 2007/0100189 | A1 | 5/2007 | Stauffer |
| 2012/0132108 | A1 | 5/2012 | Ishihara et al. |

FOREIGN PATENT DOCUMENTS

| | | |
|---|---|---|
| JP | 2004-529189 A | 9/2004 |
| KR | 10-2003-0059725 A | 7/2003 |
| KR | 10-2012-0095844 A | 8/2012 |
| KR | 10-2013-0067518 A | 6/2013 |

OTHER PUBLICATIONS

Fang et. al., Hollow Mesoporous Aluminosilica Spheres with Perpendicular Pore Channels as Catalytic Nanoreactors, 2012, ACSNANO, 6 No. 5, 4434-4444.*

Kamata et. al., Synthesis and Characterization of Monodispersed Core-Shell Spherical Colloids with Movable Cores, 2002, J. Am. Chem. Soc., 125, 2384-2385.*

Wang et al. "Preparing an active cerium oxide catalyst for the catalytic incineration of aromatic hydrocarbons", 2004, Applied Catalysis A, 268, 227-233.*

Fang et al. "Hollow Mesoporous Aluminosilica Speheres with Perpendicuar Pore Channels as Catalytic Nanoreactors," ACS Nano vol. 6(5): pp. 4434-444 (2012).

Zhang et al. "Advances in reaction of oxidative coupling of methane for ethylene production," Research Institute of Daqing Petrochemical Company vol. 27(3): pp. 20-25 (2007). (English Language Abstract included on first page).

* cited by examiner

[Figure 1]
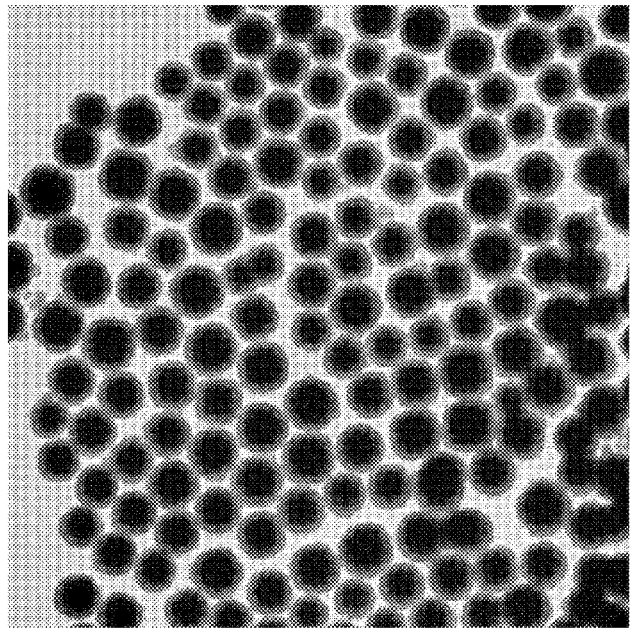
[Figure 2]
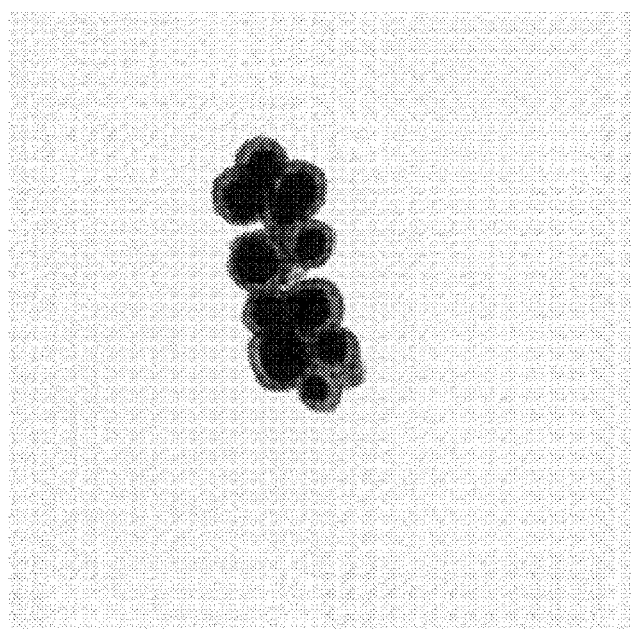

[Figure 3]
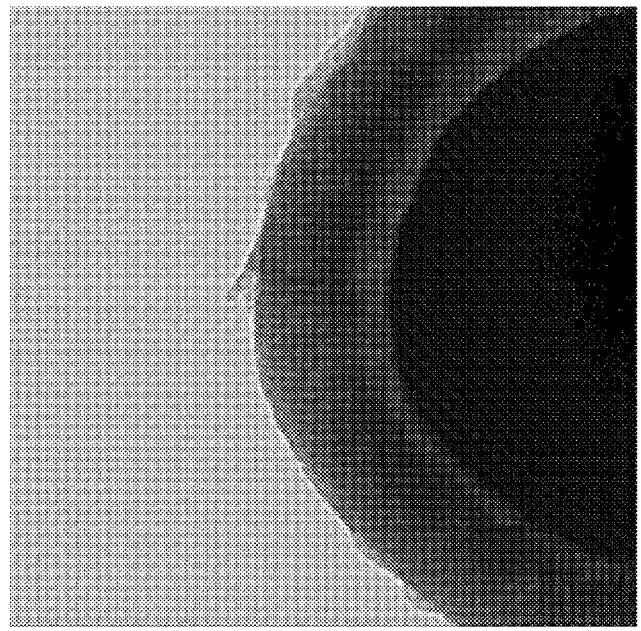
[Figure 4]
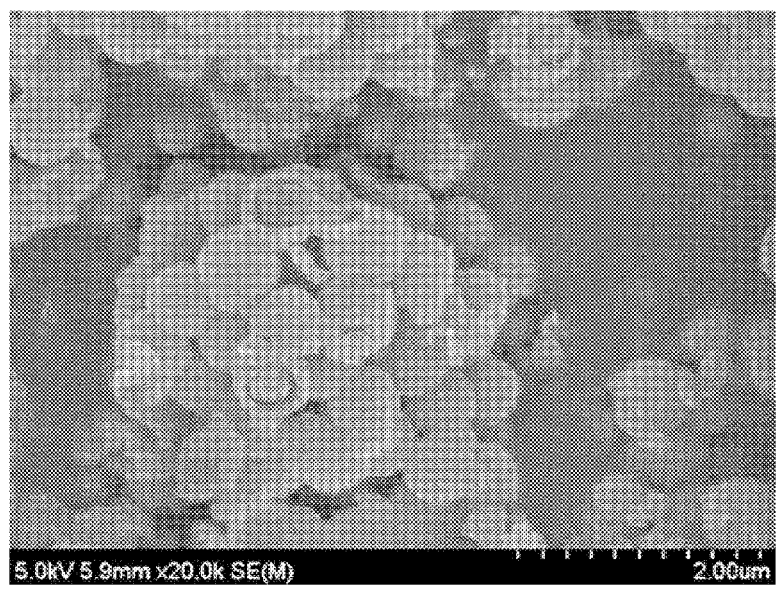

[Figure 5]
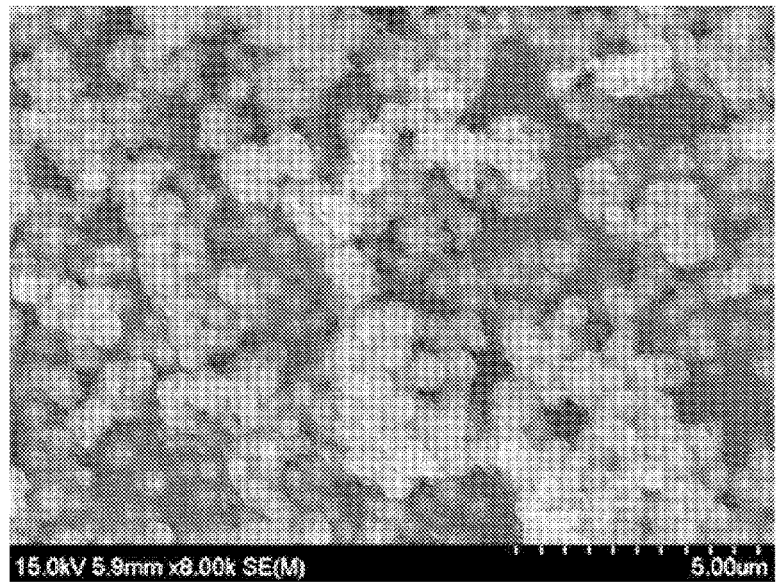
[Figure 6]
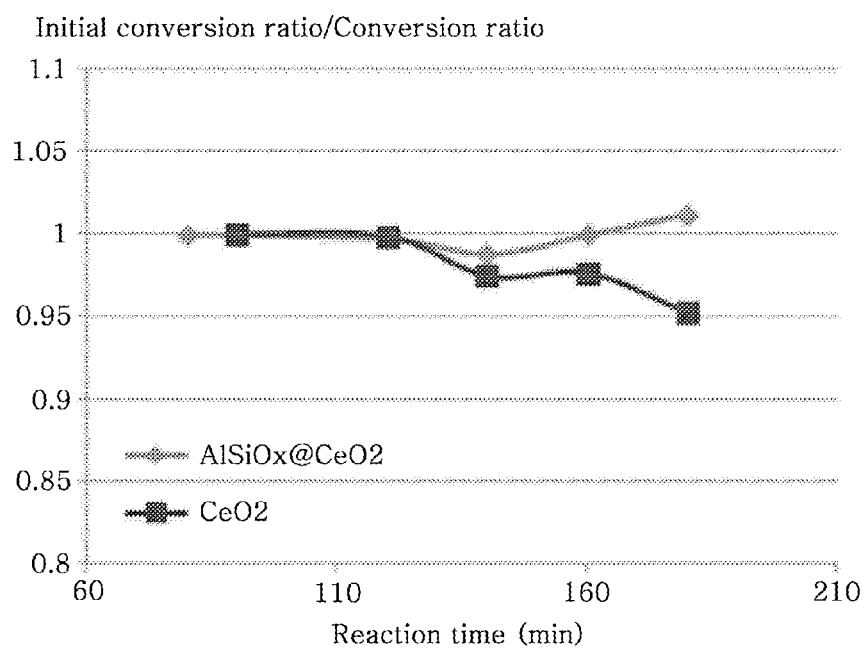

[Figure 7]
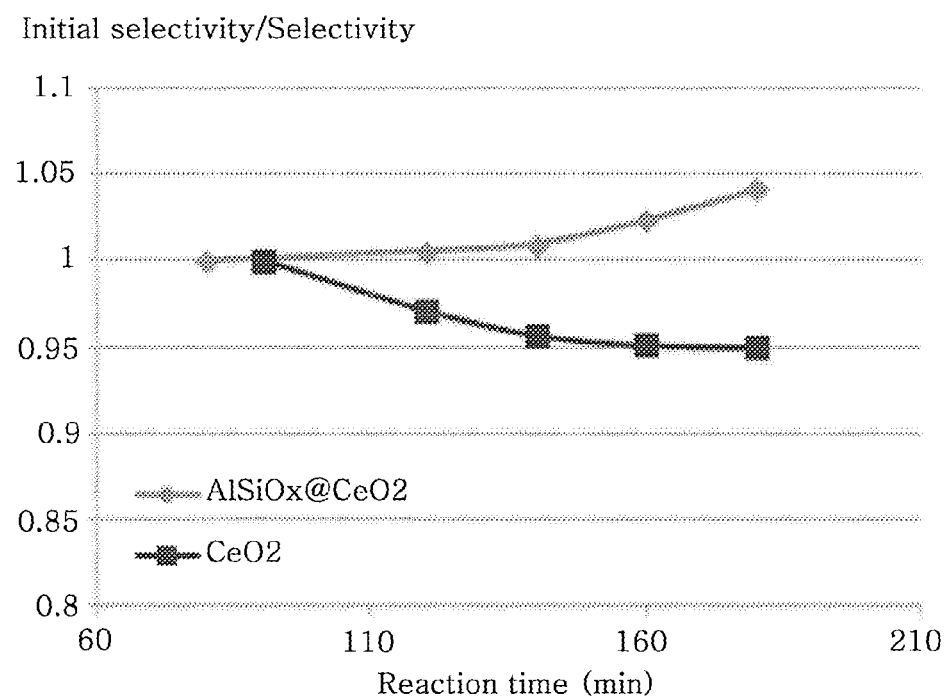
[Figure 8]
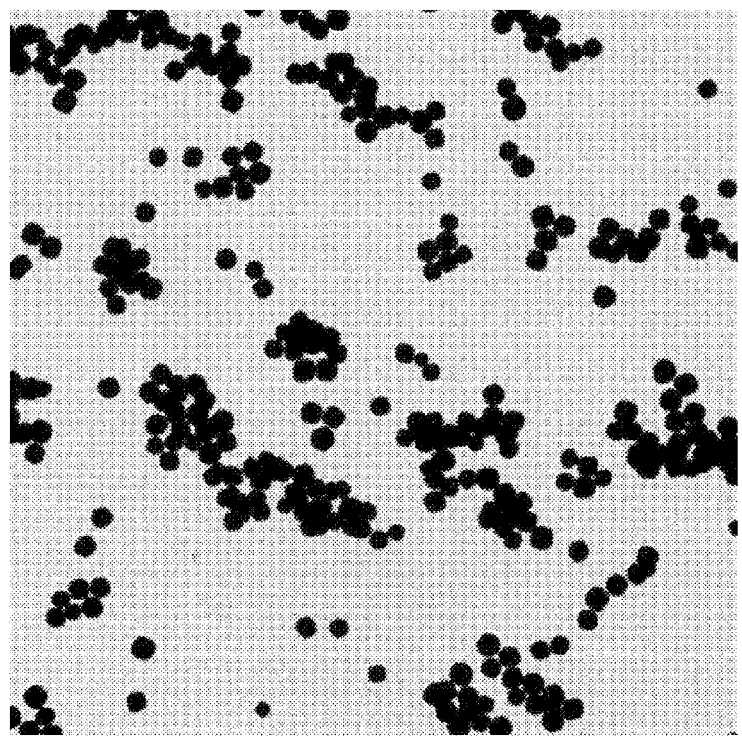

YOLK-SHELL PARTICLES, CATALYST, AND PREPARATION METHOD THEREFOR

TECHNICAL FIELD

This application is a National Stage Entry of International Application No. PCT/KR2014/011563, filed Nov. 28, 2014, and claims the benefit of and priority to Korean Patent Application No. 10-2013-0147016, filed in the Korean Intellectual Property Office on Nov. 29, 2013, both of which are incorporated herein by reference in their entirety for all purposes as if fully set forth herein.

The present specification relates to a yolk-shell particle, a catalyst, and a method of manufacturing the same.

BACKGROUND ART

Unlike a bulk material, because of specialized properties of a nano-material, various research for synthesizing and using metal and metal oxide at a nano level has been conducted.

It is judged that since an optical property or a catalyst property of nano-particles is largely changed according to a size, a shape, and a structure thereof, a good design and synthesis of a nano-particle structure can contribute to understanding of catalyst phenomena, which are difficult to be interpreted in an existing bulk material, and moreover, development of a catalyst that is favorable to a predetermined reaction by adjusting chemical activity, peculiarity, selectivity, and the like.

Specifically, research of adjusting a particle size of the nano-particles and a distribution thereof is being conducted so as to contribute to a more preferable synthesis of the catalyst, and research of a nano-structure having a core-shell or yolk-shell structure which does not cause agglomeration and can provide thermal stability is being actively conducted.

DETAILED DESCRIPTION OF THE INVENTION

Technical Problem

The present specification has been made in an effort to provide a yolk-shell particle, a catalyst, and a method of manufacturing the same.

Technical Solution

An exemplary embodiment of the present specification provides a yolk-shell particle including: a silica shell; and a rare earth metal oxide core provided in the silica shell, in which at least a portion of the shell is disposed to be spaced apart from the core.

Another exemplary embodiment of the present specification provides a catalyst including the yolk-shell particle.

Yet another exemplary embodiment of the present specification provides a method of manufacturing a yolk-shell particle, including: forming a silica shell on a surface of a rare earth metal oxide core; and forming a yolk-shell particle by disposing at least a portion of the shell to be spaced apart from the core.

Advantageous Effects

The yolk-shell particle according to the present specification has high sintering stability at high temperatures.

The yolk-shell particle according to the present specification has high catalyst performance.

The yolk-shell particle according to the present specification can be reused.

BRIEF DESCRIPTION OF DRAWINGS

FIG. 1 is a transmission electron microscope (TEM) picture of a $CeO_2@SiO_2$ core-shell at a 2500 magnification.

FIG. 2 is a TEM picture of a $CeO_2@Al$—SiOx yolk-shell at a 2500 magnification.

FIG. 3 is a TEM picture of a $CeO_2@Al$—SiOx yolk-shell at a 40000 magnification.

FIGS. 4 and 5 are scanning electron microscope (SEM) pictures of a yolk-shell particle according to the present specification.

FIG. 6 is a graph for a methane conversion ratio according to time.

FIG. 7 is a graph for selectivity of $CH_3Br$ according to time.

FIG. 8 is a TEM picture of a $CeO_2$ particle at a 2500 magnification.

BEST MODE

Hereinafter, the present specification will be described in detail.

The present specification provides a yolk-shell particle including a silica shell; and a rare earth metal oxide core provided in the silica shell.

At least a portion of the shell may be disposed to be spaced apart from the core. Specifically, at least the portion of the shell and the core may be spaced apart from each other to allow a space to exist.

In an exemplary embodiment of the present specification, the entire surface of the core may be spaced apart from the shell. That is, the core provided in the shell may not be chemically bonded to an internal surface of the shell.

At least the portion of the shell may be disposed to be spaced apart from the core provided in the silica shell, and a hole may be provided in the shell.

When the yolk-shell particle of the present specification participates in a chemical reaction, accessibility with a reactant through the hole provided in the shell may be increased. Further, since the shell and the core are spaced apart from each other to form the space, a contact area between the core positioned in the shell and the reactant may be increased.

As illustrated in FIG. 4, in the yolk-shell particle of the present specification, at least the portion of the shell may be disposed to be spaced apart from the core provided in the silica shell, and the hole may be provided in the shell.

In the exemplary embodiment of the present specification, the shell may be an aluminum silica shell. Specifically, the aluminum silica shell may include AlSiOx. In this case, the aluminum silica shell not only has a simple shell function, but also is capable of participating in a two-step reaction where methyl halide such as $CH_3Br$ as an acid catalyst is converted into a light olefin-based compound.

A thickness of the silica shell may be 10 nm or more and less than 500 nm.

The rare earth metal oxide core may include at least one of cerium (Ce) oxide, scandium (Sc) oxide, yttrium (Y) oxide, lanthanum (La) oxide, actinium (Ac) oxide, praseodymium (Pr) oxide, neodymium (Nd) oxide, promethium (Pm) oxide, samarium (Sm) oxide, europium (Eu) oxide, gadolinium (Gd) oxide, terbium (Tb) oxide, dysprosium (Dy) oxide, holmium (Ho) oxide, erbium (Er) oxide, thulium (Tm) oxide, ytterbium (Yb) oxide, and lutetium (Lu) oxide, or an alloy of two or more thereof.

Specifically, the rare earth metal oxide core may include cerium oxide (CeOx). For example, cerium oxide (CeOx) may be $CeO_2$, and in this case, $CeO_2$ is easily oxidized and reduced into $Ce^{4+}/Ce^{3+}$ and this property affects an increase in reactivity.

A diameter of the rare earth metal oxide core may be 0.1 nm or more and less than 500 nm.

A distance between the core and the shell disposed to be spaced apart from each other may be 5 nm or more and less than 500 nm.

An average particle size of the yolk-shell particles may be 10 nm or more and less than 1000 nm.

In the present specification, a structure of the yolk-shell particle is a term derived from an egg, and a structure of the yolk-shell particle means a structure having a space between a core and a shell as the egg has a structure of a yolk, a white, and a shell in order.

In the present specification, since a catalyst reaction mostly occurs on a surface of rare earth metal oxide positioned in the core, in the case where the size and the shape of the rare earth metal oxide catalyst particle of the core are adjusted and the shell is then coated, it is easy to adjust activity and selectivity of the rare earth metal oxide particle of the core.

In the present specification, the shell may be formed by metal oxide such as $SiO_2$ to reduce a phenomenon where the rare earth metal oxide catalyst particles are agglomerated or peeled off under a severe reaction condition such as a high temperature and a high pressure and thus increase stability of the catalyst.

In the present specification, since the catalyst reaction occurs in an inside of the shell having a predetermined space, each metal catalyst may have an effect that is similar to occurrence of the reaction under a uniform environment, and more detailed information on the catalyst reaction may be obtained.

In the case of the core-shell, since metal oxide surrounds the metal catalyst particle, it is difficult to use the entire surface of the metal catalyst.

In the yolk-shell particle of the present specification, a chemical or physical interaction between the shell and the core is maintained and the entire surface of the catalyst can be used.

In the yolk-shell particle of the present specification, since a catalyst property is provided to the shell, the shell participates together in the reaction, and thus the reaction of the catalyst particles is improved.

In the yolk-shell particle of the present specification, since the catalyst property is provided to the shell, the shell participates together in the catalyst reaction, and thus steps of the catalyst reaction are simplified.

The present specification provides a catalyst including the yolk-shell particle.

In the exemplary embodiment of the present specification, the catalyst may be used in various catalyst fields.

The catalyst including the yolk-shell particle is a catalyst that is strong to acid because the rare earth metal oxide core of the yolk-shell particle is strong to acid, and specifically the catalyst including the yolk-shell particle is a catalyst that can serve as the catalyst under an acid condition having a pH of 1 or less.

In the case where a transition metal that is weak to acid, such as nickel, palladium, silver, and copper, is used as the core of the yolk-shell particle, the core is melted out by acid, and thus the core cannot serve as the catalyst under the acid condition.

In the case where a metal having low catalyst activity, such as gold, is used as the core of the yolk-shell particle, since catalyst activity is low, a catalyst reaction speed is slow, and thus efficiency is reduced.

Since a precious metal including platinum as the core of the yolk-shell particle is costly, a prime cost per performance of the catalyst is high.

For example, the yolk-shell particle may serve as the catalyst in any one reaction of an oxidative halogenation of C1 hydrocarbons reaction and an OCM (direct oxidative coupling of methane) reaction where ethane and ethylene are manufactured by direct conversion from a methane gas.

Specifically, the catalyst may be used in the oxidative halogenation of C1 hydrocarbons reaction. The shell of the present catalyst includes Al—SiOx having an acid catalyst property, and thus the steps of the catalyst reaction are simplified.

The catalyst of the present specification may be used as a catalyst converting methane into propylene.

Specifically, a core material may be a first step catalyst converting methane into methyl halides such as methyl bromide and methyl chloride, and the shell may be a second step catalyst converting methyl bromide converted by the first step catalyst into propylene. Accordingly, the steps of the catalyst reaction may be simplified through the catalyst of the present specification.

A first step of converting methane into methyl halides is a step of supplying methane, oxygen, and a HBr aqueous solution (or HCl aqueous solution), oxygen, and the HBr aqueous solution (or HCl aqueous solution) into contact with the catalyst, and herein, since HBr or HCl is a composition required to convert methane into $CH_3Br$ or $CH_3Cl$, in the present process, the catalyst should have a property that is strong to acid.

The present specification provides the method of manufacturing the yolk-shell particle, including forming the silica shell on the surface of the rare earth metal oxide core; and forming the yolk-shell particle by disposing the shell to be spaced apart from the core.

There is provided the method of manufacturing the yolk-shell particle, in which the forming of the yolk-shell particle includes forming the hole in the shell and disposing the shell to be spaced apart from the core to form the yolk-shell particle.

In the exemplary embodiment of the present specification, the method may further include before the forming of the silica shell, manufacturing the rare earth metal oxide core by using a rare earth metal oxide precursor, a surfactant, and a solvent.

A kind of the rare earth metal oxide precursor is not limited, but the rare earth metal oxide precursor is a salt including rare earth metal ions or atomic group ions including the rare earth metal ions, and may serve to provide the rare earth metal.

An example of the rare earth metal oxide precursor including a cerium (Ce) ion or an atomic group ion including the cerium ion as the rare earth metal oxide precursor, may be at least one of $Ce(NO_3)_3$, $CeCl_3$, $CeF_3$, $(NH_4)_2Ce(NO_3)_6$, $Ce_2(SO_4)_3$, $Ce(NH_4)_4(SO_4)_4$, $Ce(CH_3COO)_3$, and $Ce(CH_3COCHCOCH_3)_3$.

The surfactant is not particularly limited as long as the surfactant can help dispersion of the rare earth metal oxide precursor, but an example thereof may be at least one of polyvinyl pyrrolidone (PVP), polymethylvinyl ether (PMVE), polyethyleneimine (PEI), polyvinyl alcohol (PVA), polyoxyethylenealkylphenyl ether, or a derivative thereof.

When the content of the rare earth metal oxide precursor is 100 parts by weight, the content of the surfactant may be 10 parts by weight or more and 100 parts by weight or less. Specifically, the content of the surfactant may be 10 parts by weight or more and 70 parts by weight or less.

In the manufacturing of the rare earth metal oxide core, the solvent is not particularly limited, but examples thereof include at least one or a mixture of two kinds or more of water, ethanol, hexane, cyclohexane, toluene, and isopropyl alcohol.

A composition for manufacturing the rare earth metal oxide core may further include transition metal oxide, and examples thereof include at least one of FeOx, NiOx, and CoOx.

In the case where transition metal oxide is added to the composition for the rare earth metal oxide core, when a total content of the rare earth metal oxide precursor and a transition metal oxide precursor is 100 parts by weight, the content of the rare earth metal oxide precursor may be 30 parts by weight or more and 99 parts by weight or less, and the content of the transition metal oxide precursor may be 1 part by weight or more and 70 parts by weight or less. Specifically, when the total content of the rare earth metal oxide precursor and the transition metal oxide precursor is 100 parts by weight, the content of the rare earth metal oxide precursor may be 70 parts by weight or more and 99 parts by weight or less, and the content of the transition metal oxide precursor may be 1 part by weight or more and 30 parts by weight or less.

A heating temperature in the manufacturing of the rare earth metal oxide core may be 100° C. or more and 250° C. or less. Specifically, the temperature may be 130° C. or more and 180° C. or less.

A heating time in the manufacturing of the rare earth metal oxide core may be 12 hours or more and 48 hours or less. Specifically, the time may be 20 hours or more and 24 hours or less.

In the manufacturing of the rare earth metal oxide core, the rare earth metal oxide precursor and the surfactant may be dissolved in the solvent and then reacted by using a hydrothermal reactor.

The method may further include after the manufacturing of the rare earth metal oxide core, separating the rare earth metal oxide core. In this case, a separating method is not particularly limited as long as the rare earth metal oxide core can be separated from the solution including the solvent and the like, but for example, the rare earth metal oxide core may be separated by using a centrifuge.

A diameter of the rare earth metal oxide core manufactured in the present specification may be 0.1 nm or more and less than 500 nm.

The method of manufacturing the yolk-shell particle of the present specification may include forming the silica shell on the surface of the rare earth metal oxide core.

The precursor of the silica shell, which will form the silica shell on the surface of the core, is not particularly limited as long as the precursor can form the shell including silica (oxide of silicon, SiOx) on the surface of the core, but an example thereof may be any one of tetraethyl orthosilicate, tetramethyl orthosilicate (TMOS), and sodium silicate.

The solvent used in the forming of the silica shell of the present specification is not particularly limited, but examples thereof may include at least one of water and alcohols such as methanol, ethanol, and butanol.

In the exemplary embodiment of the present specification, the forming of the silica shell may include surface modification of the manufactured rare earth metal oxide core; and forming the silica shell on the modified surface of the rare earth metal oxide core.

A thickness of the silica shell manufactured in the present specification may be 10 nm or more and less than 500 nm.

The method of manufacturing the yolk-shell particle of the present specification may include forming the yolk-shell particle by disposing at least a portion of the shell to be spaced apart from the core.

The portion of the shell is dissolved in the particle of the core-shell structure to form the hole, and while silica formed on the surface of the core is dissolved out through the formed hole, at least the portion of the shell is disposed to be spaced apart from the core. Silica that is dissolved out may form the shell again on the outermost surface of the shell to form the yolk-shell particle.

The forming of the yolk-shell particle may include denaturalizing the shell into an aluminum silica shell. That is, the yolk-shell particle constituted by the rare earth metal oxide core and the aluminum silica shell of AlSiOx may be manufactured.

In the exemplary embodiment of the present specification, the method may further include, after the forming of the yolk-shell particle, performing a hydrothermal reaction of the yolk-shell. In the formed yolk-shell, a density and strength of the shell may be increased through the hydrothermal reaction.

A distance between the core and the shell disposed to be spaced apart from each other may be 5 nm or more and less than 500 nm.

The forming of the yolk-shell particle may further include separating the manufactured yolk-shell particle. In this case, a separating method is not particularly limited as long as the yolk-shell particle can be separated from the solution including the solvent and the like, but for example, the yolk-shell particle may be separated by using a centrifuge.

The forming of the yolk-shell particle may further include drying the separated yolk-shell particle and then calcining the yolk-shell particle.

Hereinafter, the present application will be specifically described in detail with reference to Examples and Comparative Examples. However, the Examples according to the present application may be modified in various other forms, and the scope of the present application is not interpreted to be limited to the Examples as will be described in detail below.

EXAMPLE

Example 1

1.6 g of $Ce(NO_3)_3$ and 0.8 g of polyvinyl pyrrolidone were dissolved in 30 ml of water, and reacted at 150° C. for 24 hours by using the hydrothermal reactor, and the $CeO_2$ particle was then separated by using the centrifuge. After the $CeO_2$ particle was dispersed in 25 ml of ethanol, 4 ml of deionized water and 0.5 ml of ammonia water were added thereto and stirred. And then, 0.8 ml of tetraethyl orthosilicate was added thereto and stirred for 5 hours, and thereafter, the core-shell structure was obtained by using the centrifuge. After the core-shell structure was dispersed in 25 ml of deionized water, 0.03 g of cetyltrimethylammonium bromide (CTAB), 0.05 g of $Na_2CO_3$, and 0.06 g of $NaAlO_2$ were put and stirred at 80° C. for 15 hours. The structure having the yolk-shell was separated by using the centrifuge again, dispersed in deionized water, reacted at 100° C. for 24 hours by using the hydrothermal reactor, and dried by using the vacuum oven. The dried yolk-shell particle was calcined in the air at the temperature of 550° C.

Experimental Example 1

Transmission Electron Microscope (TEM) and Scanning Electron Microscope (SEM) Measurement The $CeO_2@SiO_2$ core-shell and the $CeO_2@Al\text{—}SiOx$ yolk-shell manufactured in Example 1 and the $CeO_2$ particle were measured by the transmission electron microscope (TEM), and the measurement images are illustrated in FIGS. 1 to 3 and 8.

Further, the $CeO_2@Al\text{—}SiOx$ yolk-shell manufactured in Example 1 was measured by the scanning electron microscope (SEM), and the measurement images are illustrated in FIGS. 4 and 5.

Experimental Example 2

Evaluation of Catalyst Activity

The oxidative bromination reaction of methane was performed through the fixed-bed flow reactor at normal pressure. In evaluation of catalyst activity, the powder catalyst was pelletized at the pressure of 2 tons to select particles having the average diameter of 0.17 mm through the 300 mesh sieve and the 150 mesh sieve.

The amount of the catalyst (Example 1) used in the reaction was 0.2 g, and if the temperature was increased under the oxygen and nitrogen flow to reach a predetermined temperature, the reaction was induced. In this case, the time enough to allow the reaction to reach the stable condition was provided while the reaction was observed for 1 hour or more. The used reaction gas was allowed to flow so that the flow rates of $CH_4/O_2/N_2$ were 20/5/5 ml/min to perform the reaction, and hydrogen bromide (HBr) was injected at the rate of 0.05 ml/min (3 ml/h) in the 48 wt % aqueous solution state by using the liquid syringe pump to be mixed with the reactant ($CH_4/O_2/N_2$) in the gas state and thus be used in the reaction. The unreacted substances and the products of the gas components were analyzed by using the HP6890 gas chromatography (GC), and $CH_4$, CO, $CO_2$, $O_2$, and $N_2$ were analyzed by the thermal conductivity detector (TCD) by connecting the Porapak Q 80/100 12 ft manufactured by Supelco, Inc. and Molseive 60/80 6 ft-length ⅛" packed column. Further, the reaction products of hydrocarbons such as $CH_4$, $CH_3Br$, $C_2H_4$, $C_3H_6$, and $C_4H_8$ were separated by using Porabond Q, 25 m, 0.53 mm capillary column manufactured by Restek Corporation, and analysis was performed by the flame ionization detector (FID) and described in the following Table 1.

In Table 1, the blank indicates the result of the experiment without the catalyst, AlSiOx is the result of the experiment using commercial zeolite, and $CeO_2$ is the result of the experiment using the commercial ceria particle. $AlSiOx@CeO_2$ is the result of the experiment using the yolk-shell particle of Example 1, conversion means the conversion ratio of methane, and selectivity means selectivity of $CH_3Br$.

TABLE 1

| Catalyst | Conversion (%) | Selectivity (%) |
|---|---|---|
| blank | 11.6 | 99.6 |
| AlSiOx | 10.4 | 96.5 |

TABLE 1-continued

| Catalyst | Conversion (%) | Selectivity (%) |
|---|---|---|
| $CeO_2$ | 30.8 | 82.0 |
| $AlSiOx@CeO_2$ | 37.8 | 87.2 |

Further, a graph for the methane conversion ratio according to time is illustrated in FIG. 6, and a graph for selectivity of $CH_3Br$ according to time is illustrated in FIG. 7.

According to FIGS. 6 and 7, it can be confirmed that in the case of commercial $CeO_2$, as the reaction time is increased, the conversion ratio and selectivity are reduced. This is considered as the result caused because the $CeO_2$ particle is sintered at high temperatures according to time.

Meanwhile, it can be confirmed that in the case of the $AlSiOx@CeO_2$ catalyst having the yolk-shell structure, the conversion ratio and selectivity are maintained as the reaction time is increased, and this is considered as the result caused by peculiarity of the yolk-shell structure.

The invention claimed is:

1. A yolk-shell particle comprising:
    an aluminum silica shell; and
    a rare earth metal oxide core provided in the aluminum silica shell,
    wherein at least a portion of the shell is disposed to be spaced apart from the core,
    wherein the rare earth metal oxide core includes at least one of a cerium (Ce) oxide formed by reacting Ce(NO₃) with polyvinyl pyrrolidone at a reaction temperature of 150° C., a scandium (Sc) oxide, a yttrium (Y) oxide, a lanthanum (La) oxide, an actinium (Ac) oxide, a praseodymium (Pr) oxide, a neodymium (Nd) oxide, a promethium (Pm) oxide, a samarium (Sm) oxide, a europium (Eu) oxide, a gadolinium (Gd) oxide, a terbium (Tb) oxide, a dysprosium (Dy) oxide, a holmium (Ho) oxide, an erbium (Er) oxide, a thulium (Tm) oxide, a ytterbium (Yb) oxide, and a lutetium (Lu) oxide, or an alloy of two or more thereof,
    wherein when the rare earth metal oxide is cerium (Ce) oxide, the yolk-shell particle has been calcined at a temperature of 550° C., and
    wherein the core and the shell are spaced apart from each other by a distance of 5 nm or more and less than 500 nm.

2. The yolk-shell particle of claim 1, wherein the shell has a hole.

3. The yolk-shell particle of claim 1, wherein the rare earth metal oxide core includes the cerium (Ce) oxide.

4. The yolk-shell particle of claim 1, wherein a diameter of the rare earth metal oxide core is 0.1 nm or more and less than 500 nm.

5. The yolk-shell particle of claim 1, wherein a thickness of the silica shell is 10 nm or more and less than 500 nm.

6. A catalyst comprising:
    the yolk-shell particle according to claim 1.

7. The catalyst of claim 6, wherein the catalyst is used in an oxidative halogenation of C1 hydrocarbons reaction or an OCM (direct oxidative coupling of methane) reaction where ethane and ethylene are manufactured by direct conversion from a methane gas.

8. A method of manufacturing a yolk-shell particle, comprising:
    forming a silica shell on a surface of a rare earth metal oxide core; and
    forming the yolk-shell particle by disposing at least a portion of the shell to be spaced apart from the core.

9. The method of claim 8, wherein the forming of the yolk-shell particle includes forming a hole in the shell.

10. The method of claim 8, wherein the forming of the yolk-shell particle includes denaturalizing the shell into an aluminum silica shell.

11. The method of claim 8, further comprising:
before the forming of the silica shell, manufacturing the metal oxide core by using a rare earth metal oxide precursor, a surfactant, and a solvent.

12. The method of claim 8, further comprising:
after the forming of the yolk-shell particle, performing a hydrothermal reaction of the yolk-shell.

\* \* \* \* \*